(12) United States Patent
Hagiwara et al.

(10) Patent No.: US 10,746,230 B2
(45) Date of Patent: Aug. 18, 2020

(54) MANUFACTURING METHOD FOR ROLLING BEARING UNITS FOR WHEEL SUPPORT

(71) Applicant: NSK LTD., Tokyo (JP)

(72) Inventors: Nobuyuki Hagiwara, Fujisawa (JP); Ryusuke Nagae, Hanyuu (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 106 days.

(21) Appl. No.: 15/567,839

(22) PCT Filed: May 30, 2016

(86) PCT No.: PCT/JP2016/065879
§ 371 (c)(1),
(2) Date: Oct. 19, 2017

(87) PCT Pub. No.: WO2016/194866
PCT Pub. Date: Dec. 8, 2016

(65) Prior Publication Data
US 2018/0149206 A1    May 31, 2018

(30) Foreign Application Priority Data
Jun. 5, 2015    (JP) ................ 2015-114567

(51) Int. Cl.
*F16C 43/06*    (2006.01)
*B60B 27/00*    (2006.01)
(Continued)

(52) U.S. Cl.
CPC ........ *F16C 43/065* (2013.01); *B60B 27/0005* (2013.01); *B60B 27/0084* (2013.01);
(Continued)

(58) Field of Classification Search
CPC ......... B21J 9/025; G01L 5/0009; F16C 43/04; F16C 19/186
(Continued)

(56) References Cited

U.S. PATENT DOCUMENTS

| 4,698,992 A | * | 10/1987 | Bernet | ..................... B21J 9/025 72/67 |
| 6,363,799 B1 | | 4/2002 | Toda et al. | |

(Continued)

FOREIGN PATENT DOCUMENTS

| CN | 1813139 A | 8/2006 |
| CN | 101035995 A | 9/2007 |

(Continued)

OTHER PUBLICATIONS

Machine Translation of JP2001003945A (Year: 2001).*
(Continued)

*Primary Examiner* — Jacob J Cigna
*Assistant Examiner* — Michael W Hotchkiss
(74) *Attorney, Agent, or Firm* — Sughrue Mion, PLLC

(57) ABSTRACT

A method of manufacturing a rolling bearing unit for supporting a wheel includes detecting a current value flowing through an electric motor (19) configured to drive a roll (22) and determining a time to terminate a caulking process on the basis of the detected value when a caulking section (13) is formed by pressing the roll (22), inclined with respect to a central axis of a hub main body (7) and supported in a rotatable state about a central axis of the roll, against a cylindrical section (12), installed on an inner end portion of the hub main body (7) in the axial direction, while the roll (22) is rotated about the central axis of the hub main body (7).

4 Claims, 7 Drawing Sheets

(51) Int. Cl.
*B60B 35/02* (2006.01)
*F16C 19/18* (2006.01)

(52) U.S. Cl.
CPC .......... *B60B 27/0094* (2013.01); *B60B 35/02* (2013.01); *B60B 2310/314* (2013.01); *B60B 2310/316* (2013.01); *B60B 2310/3142* (2013.01); *F16C 19/18* (2013.01)

(58) Field of Classification Search
USPC ...................................................... 29/407.01
See application file for complete search history.

(56) References Cited

U.S. PATENT DOCUMENTS

| | | | | |
|---|---|---|---|---|
| 7,832,940 | B2 * | 11/2010 | Matsui | B21J 9/025 29/898.09 |
| 8,631,581 | B2 * | 1/2014 | Sera | B21D 39/00 29/898.062 |
| 2003/0185479 | A1 * | 10/2003 | Toda | B60B 27/00 384/544 |
| 2003/0213128 | A1 | 11/2003 | Kaimi et al. | |
| 2005/0126005 | A1 | 6/2005 | Yasumura et al. | |
| 2012/0119686 | A1 * | 5/2012 | Bertotto | H02P 21/22 318/400.02 |
| 2016/0263940 | A1 * | 9/2016 | Hagiwara | B21D 53/12 |

FOREIGN PATENT DOCUMENTS

| | | | | | |
|---|---|---|---|---|---|
| EP | 2 722 548 | A1 | | 4/2014 | |
| JP | 11-044319 | A | | 2/1999 | |
| JP | 2000-317552 | A | | 11/2000 | |
| JP | 2001-3945 | A | | 1/2001 | |
| JP | 2001003945 | A | * | 1/2001 | ......... B60B 27/0084 |
| JP | 2001-050832 | A | | 2/2001 | |
| JP | 2002-081453 | A | | 3/2002 | |
| JP | 2003-028179 | A | | 1/2003 | |
| JP | 2005-36905 | A | | 2/2005 | |
| JP | 2005036905 | A | * | 2/2005 | ............. F16C 43/04 |
| JP | 3930675 | B2 | * | 6/2007 | ......... B60B 27/0084 |
| JP | 2010-175079 | A | | 8/2010 | |
| JP | 2015-077616 | A | | 4/2015 | |

OTHER PUBLICATIONS

Machine Translation of JP-3930675-B2 (Year: 2007).*
Machine Translation of JP-2005036905-A (Year: 2005).*
International Search Report for PCT/JP2016/065879, dated Aug. 16, 2016.
Search Report dated Nov. 2, 2018 from the State Intellectual Property Office of the P.R.C. in application No. 2016800322360.
Communication dated Dec. 20, 2018 from European Patent Office in counterpart EP Application No. 16803301.7.
Communication dated Feb. 20, 2018 from European Patent Office in counterpart EP Application No. 16803301.7.

* cited by examiner

MANUFACTURING METHOD FOR ROLLING BEARING UNITS FOR WHEEL SUPPORT

CROSS REFERENCE TO RELATED APPLICATIONS

This application is a National Stage of International Application No. PCT/JP2016/065879 filed May 30, 2016, claiming priority based on Japanese Patent Application No. 2015-114567, filed Jun. 5, 2015, the contents of all of which are incorporated herein by reference in their entirety.

TECHNICAL FIELD

The present invention relates to a method of manufacturing a rolling bearing unit for supporting a wheel in order to support a wheel of an automobile using a suspension system.

Priority is claimed on Japanese Patent Application No. 2015-114567, filed Jun. 5, 2015, the contents of which are incorporated herein by reference.

BACKGROUND ART

FIG. 6 shows an example of a rolling bearing unit for supporting a wheel disclosed in Patent Literature 1. A rolling bearing unit 1 for supporting a wheel shown in FIG. 6 includes an outer ring 2, a hub 3, and a plurality of rolling elements (in the example shown, balls) 4 and 4.

The outer ring 2 has a stationary side flange 5 formed on an outer circumferential surface thereof, and a plurality of rows of outer ring tracks 6a and 6b formed on an inner circumferential surface thereof. In addition, the hub 3 is formed by assembling a hub main body 7 and an inner ring 8. The hub main body 7 has a rotary side flange 9 formed on a portion of the hub main body 7 close to an outer end of an outer circumferential surface in an axial direction, an inner ring track 10a that is formed on an intermediate section of the hub main body 7 in the axial direction and that is disposed outside of the intermediate section in the axial direction, and a small diameter step section 11 formed on an inner end portion of the hub main body 7 in the axial direction. Further, "an axial direction," "a radial direction" and "a circumferential direction" in the specification and claims are directions with respect to a hub main body unless the context clearly indicates otherwise. In addition, "an outer side" in the axial direction in the specification and claims represents an outer side in a widthwise direction of the vehicle when assembled to an automobile, that is, the left side of FIG. 6. On the other hand, the right side of FIG. 6 that is a central side of the vehicle when assembled to the automobile is referred to as "an inner side" with respect to the axial direction.

The inner ring 8 has an inner ring track 10b that is formed on an outer circumferential surface thereof and formed inside in the axial direction, and the inner ring 8 is fastened and fitted onto the small diameter step section 11 of the hub main body 7. In addition, the plurality of rolling elements 4 and 4 is installed between the outer ring tracks 6a and 6b and the inner ring tracks 10a and 10b for each row in a rollable manner. In addition, in this state, a caulking section 13 is formed by plastically deforming a portion of a cylindrical section 12, formed on an inner end portion of the hub main body 7 in the axial direction, protruding from an inner end opening of the inner ring 8 in the axial direction outward in the radial direction. Then, an appropriate preload is applied to the rolling elements 4 and 4 as an inner end surface of the inner ring 8 in the axial direction is pressed by the caulking section 13.

When the rolling bearing unit 1 for supporting a wheel configured as described above is assembled, first, the outer ring 2 is disposed around the hub main body 7, and the rolling elements 4 and 4 are installed between the outer ring track 6a outside in the axial direction among the outer ring tracks 6a and 6b and the inner ring track 10a outside in the axial direction while being held by a retainer 14a outside in the axial direction. Next, the rolling elements 4 and 4 are installed around the inner ring track 10b inside in the axial direction formed on the outer circumferential surface of the inner ring 8 while being held by a retainer 14b inside in the axial direction, and in this state, the inner ring 8 is fastened and fitted onto the small diameter step section 11 formed on the inner end portion of the hub main body 7 in the axial direction. Then, according to the on-fitting work, rolling surfaces of the rolling elements 4 and 4 held by the retainer 14b inside in the axial direction abut the outer ring track 6a outside in the axial direction. Next, the caulking section 13 is formed by plastically deforming an inner end portion of the cylindrical section 12 of the hub main body 7 in the axial direction (a portion of the inner ring 8 protruding from an inner end opening in the axial direction) outward in the radial direction. Then, the inner ring 8 can be fixed to the hub main body 7 as the inner end surface of the inner ring 8 in the axial direction is suppressed in the axial direction by the caulking section 13.

The caulking section 13 configured to fix the inner ring 8 to the hub main body 7 is formed by, for example, a rotating and caulking process as disclosed in Patent Literatures 1 to 3. When the caulking section 13 is formed by the rotating and caulking process, for example, a rotating type caulking apparatus 15 as shown in FIG. 7 is used. The rotating type caulking apparatus 15 includes a mold 16, a pressing tool 17 and a holder 18. When the caulking section 13 is formed by caulking and spreading the cylindrical section 12, the mold 16 is rotated and rotated by an actuator (not shown) while the hub 3 is pressed upward via the holder 18. That is, in a state in which a central axis of the mold 16 and a central axis of the hub 3 are inclined by an angle θ, the mold 16 is rotated about the central axis of the hub 3. When the caulking section 13 is formed by the rotating and caulking process performed using the above-mentioned rotating type caulking apparatus 15, machining work is partially and continuously performed on the caulking section 13 in the circumferential direction (the central axis of the mold 16 is rotated along a trajectory of a central axis due to a precessional motion around the central axis of the hub 3) since a portion of the mold 16 in the circumferential direction presses an inner end portion of the cylindrical section 12 in the axial direction. For this reason, in comparison with the case in which the caulking section 13 is formed by general forging, a load required for machining can be decreased.

The caulking section 13 formed as described above applies an appropriate preload to the rolling elements 4 and 4 by pressing the inner end surface of the inner ring 8 in the axial direction. In order to apply a preload having an appropriate magnitude as described above, it is desirable that the caulking section 13 makes a force pressing the inner end surface of the inner ring 8 in the axial direction outward in the axial direction (an axial force) constant (stabilize it). For this reason, in the case of the rotating and caulking process is performed using the above-mentioned rotating type caulking apparatus 15, a load applied to the cylindrical section 12 by the mold 16 and the time for applying such a load are kept constant. However, in the case of such a method, a magnitude of the applied load and the time for applying the load may not be optimized for every workpiece (according to a difference in manufacturing error or property). That is, for example, depending on a variation or the like of a protrusion amount (a protrusion length) of a portion of the cylindrical section 12 protruding from the inner end opening of the inner ring 8 in the axial direction based on the manufacturing error, there is a possibility that a load larger than a load required for applying a preload having a desired magnitude needs to be applied or the time for applying the load needs to be excessively increased.

CITATION LIST

Patent Literature

[Patent Literature 1]
Japanese Unexamined Patent Application, First Publication No. 2010-175079
[Patent Literature 2]
Japanese Unexamined Patent Application, First Publication No. 2000-317552
[Patent Literature 3]
Japanese Unexamined Patent Application, First Publication No. 2002-081453

SUMMARY OF INVENTION

Technical Problem

An object of the present invention is to provide a manufacturing method capable of optimizing a processing time for caulking of each workpiece.

Solution to Problem

In an aspect of the present invention, a rolling bearing unit for supporting a wheel includes a hub main body and an inner ring. The hub main body has an outer-side inner ring track formed on an outer circumferential surface of an intermediate section of the hub main body in an axial direction. In addition, the inner ring has an inner-side inner ring track formed on an outer circumferential surface of the inner ring and is fitted onto a portion of the hub main body close to an inner end of the hub main body in the axial direction. The inner ring is fixed to the hub main body by pressing an inner end surface of the inner ring in the axial direction with a caulking section formed by plastically deforming a cylindrical section, installed on an inner end portion of the hub main body in the axial direction (a portion of the cylindrical section protruding from an inner end opening of the inner ring in the axial direction), outward in a radial direction.

In the method of manufacturing a rolling bearing unit for supporting a wheel of the present invention, the caulking section is formed by pressing a roll, supported in a rotatable state about a central axis of the roll which is inclined with respect to a central axis of the hub main body, against the cylindrical section while the roll is rotated about a central axis of the hub main body by an electric motor. In addition, the method of manufacturing a rolling bearing unit for supporting a wheel of the present invention includes detecting a rotational torque generated by the electric motor or a physical amount having a correlation with the rotational torque during a caulking process for forming the caulking section, and determining a condition for terminating the caulking process on the basis of the detection result.

In an example, a current value of the electric motor may be employed as the physical amount.

In an example, a configuration in which the caulking process is terminated after a predetermined time elapses from a time point at which a magnitude of the rotational torque or the physical amount has decreased at a change ratio of a predetermined value or more may be employed.

In an example, a configuration in which the caulking process is terminated under a condition in which a change ratio of the rotational torque or the physical amount converges within a predetermined range after a magnitude of the rotational torque or the physical amount has decreased at a change ratio of a predetermined value or more may be employed. Specifically, the caulking process is terminated when a magnitude of the rotational torque or the physical amount stays in the predetermined range for a predetermined time or more.

Advantageous Effects of Invention

According to the aspect of the present invention, it is possible to provide a manufacturing method capable of optimizing a processing time for caulking of each workpiece.

DESCRIPTION OF EMBODIMENTS

First Embodiment

A first embodiment of the present invention will be described with reference to FIGS. 1 to 3. Hereinafter, a structure of a rotating type caulking apparatus 15a that can be used in a manufacturing method of the first embodiment will be simply described, and then the manufacturing method of the first embodiment will be described. Further, the structure of the rotating type caulking apparatus that can be used in the manufacturing method of the aspect of the present invention is not limited to the structure of the rotating type caulking apparatus 15a of the first embodiment that will be described below.

Figure 1:
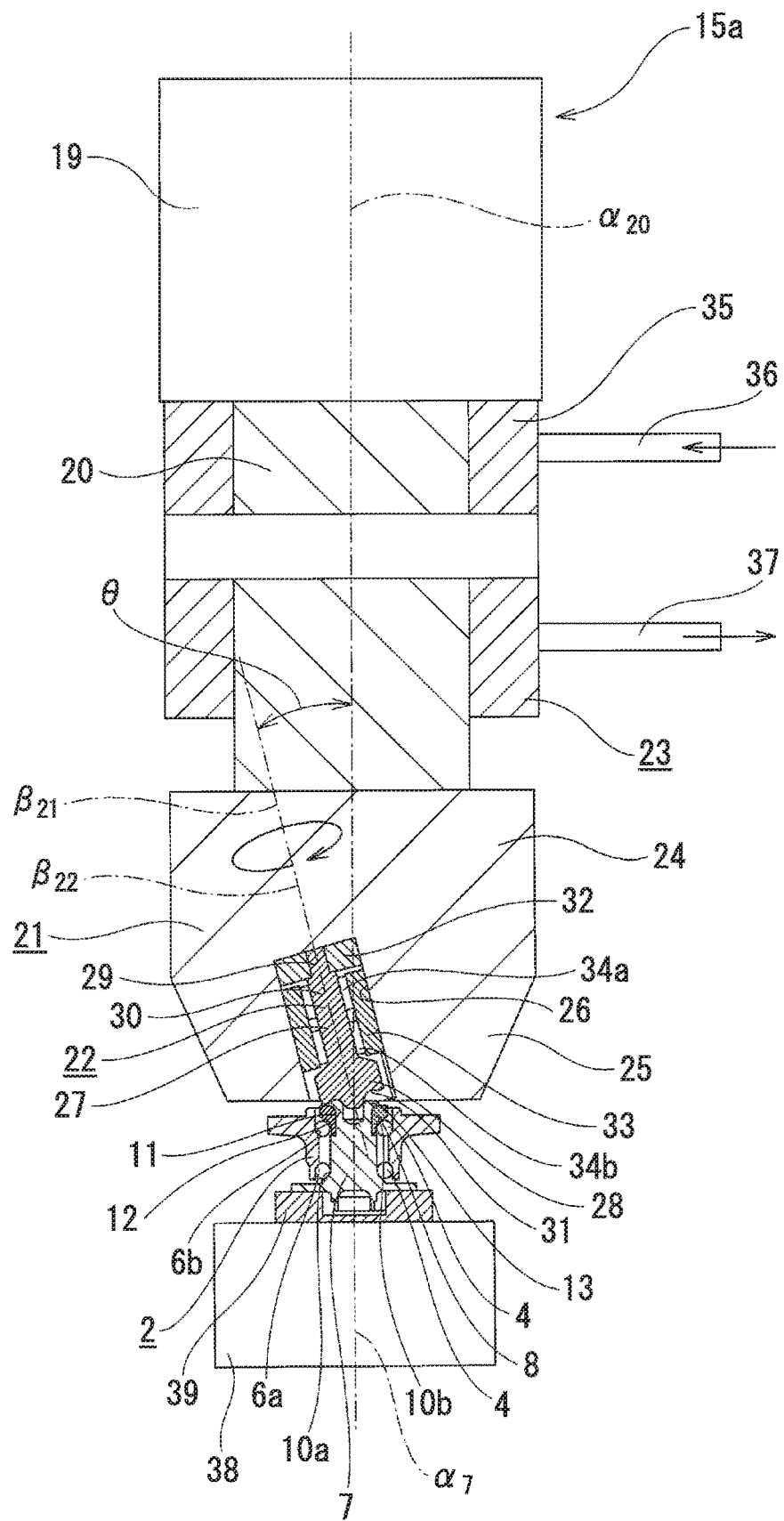
FIG. 1 is a schematic cross-sectional view of a rotating type caulking apparatus capable of performing a manufacturing method of a first embodiment of the present invention.

The rotating type caulking apparatus 15a used in the manufacturing method of the first embodiment includes, as shown in FIG. 1, an electric motor 19, a spindle 20, a roll holding part 21, a roll 22, a pressing device 23 and a current measuring device (not shown).

The electric motor 19 is constituted by, for example, an inverter and an induction motor in order to adjust a rotational speed. In addition, a servo motor may be used as the electric motor. In addition, a DC motor or a stepping motor may be used as the electric motor. The electric motor 19 is supported by a housing (not shown).

In the spindle 20, one end portion of the spindle 20 in the axial direction (an upper end portion of the spindle 20 in FIG. 1) is coupled and fixed to an output shaft (not shown) of the electric motor 19 directly (not via a mechanism configured to vary a torque or a speed of a gear or the like). The spindle 20 is rotated and driven by the electric motor 19.

The roll holding part 21 has a substantially hexagonal cross section, and is constituted by a columnar section 24 formed on a base end-side half section (an upper half section of the roll holding part 21 in FIG. 1) and a partial conical section 25 formed on a tip-side half section (a lower half section of the roll holding part 21 in FIG. 1).

The columnar section 24 has an outer diameter dimension that is larger than an outer diameter dimension of the spindle 20. The columnar section 24 couples and fixes one end portion of the columnar section 24 in the axial direction (an upper end portion of the columnar section 24 in FIG. 1) to the other end portion of the spindle 20 in the axial direction (a lower end portion of the spindle 20 in FIG. 1). In this state, a central axis of the columnar section 24 is concentric with a central axis $\alpha_{20}$ of the spindle 20.

The partial conical section 25 is formed in a state in which an outer diameter dimension thereof increases toward one side of the partial conical section 25 in the axial direction. The partial conical section 25 is formed integrally and coaxially with the columnar section 24 at the other end side of the columnar section 24 in the axial direction.

The roll holding part 21 having the above-mentioned configuration has a holding concave section 26 formed from the partial conical section 25 to a portion close to the other end of the columnar section 24 in the axial direction. Specifically, the holding concave section 26 has a cylindrical inner circumferential surface, and the holding concave section 26 is formed in the other end surface of the partial conical section 25 (the roll holding part 21) in the axial direction in a state that the holding concave section 26 is fitted in a recess at one side of the roll holding part 21 in the axial direction from the other end surface in the axial direction. A holding concave section 21 is formed in a state in which a central axis $\beta_{21}$ is inclined with respect to an output shaft of the electric motor 19, the central axis $\alpha_{20}$ of the spindle 20 and a central axis of the roll holding part 21 by a predetermined angle θ (for example, about 5 to 30 degrees).

The roll 22 is a shaft-shaped member, and is constituted by a support section 27 and a caulking forming section 28.

The support section 27 has a stepped shaft shape constituted by a small diameter shaft section 29 and a large diameter shaft section 30. The small diameter shaft section 29 has a columnar shape in which an outer diameter dimension does not vary throughout the length of the roll 22 in the axial direction. The small diameter shaft section 29 is formed on a portion of the support section 27 from a portion of the roll 22 closer to one end in the axial direction to the one end of the roll 22 in the axial direction (an upper end of the roll 22 in FIG. 1).

The large diameter shaft section 30 has a columnar shape in which an outer diameter dimension does not vary throughout the length of the roll 22 in the axial direction. The large diameter shaft section 30 is formed on a portion of the support section 27 closer to the other end of the roll 22 in the axial direction (a lower end of the roll 22 in FIG. 1) than the small diameter shaft section 29.

The caulking forming section 28 has a substantially columnar shape in which an outer diameter dimension is larger than that of the large diameter shaft section 30 of the support section 27. A caulking forming concave groove 31 is formed in an intermediate section of the caulking forming section 28 in the radial direction among the other end surface of the caulking forming section 28 in the axial direction in a state being recessed toward one side of the caulking forming section 28 in the axial direction from the other end surface in the axial direction throughout the circumference. A cross-sectional shape of the caulking forming concave groove 31 with respect to a virtual plane passing through the central axis of the roll 22 has a concave arc shape having a deepest part in the central portion thereof with respect to the roll 22 in the radial direction. Further, the caulking forming section 28 and the support section 27 may be divided and may be consisted to be detachable. According to the above-mentioned configuration, when the caulking forming section 28 should be exchanged with a new one due to abrasion, it is possible to exchange the caulking forming section 28 only, and processing cost and material cost of the roll 22 can be decreased.

The roll 22 configured as described above is held while being rotated (self-rotation) about the central axis $\beta_{22}$ thereof inside the holding concave section 26 of the roll holding part 21. Specifically, the small diameter shaft section 29 of the support section 27 that constitutes the roll 22 is inserted into a ring-shaped holding member 32 having a circular ring shape. The ring-shaped holding member 32 is fitted into and fixed to a back end portion of the holding concave section 21. In addition, in this state, the large diameter shaft section 30 of the support section 27 that constitutes the roll 22 is fitted into a sleeve 33 via a pair of rolling bearings 34a and 34b in a state in which rotation thereof with respect to the sleeve 33 is possible. The sleeve 33 is fitted into and fixed to an intermediate section of the holding concave section 21 in the axial direction. In addition, in this state, a half section of the other end surface of the roll 22 in the axial direction on the side of an inclined direction of the central axis $\beta_{22}$ of the roll 22 with respect to the central axis $\alpha_{20}$ of the spindle 20 protrudes closer to the other side of the roll holding part 21 in the axial direction than the other end surface of the roll holding part 21 in the axial direction.

The pressing device 23 is provided for pressing the roll 22 downward. The pressing device 23 is constituted by a pump (not shown) and a hydraulic cylinder 35. The hydraulic cylinder 35 supports the spindle 20 at an inner side thereof in a state that the spindle 20 is rotatable about the central axis $\alpha_{20}$ of the spindle 20 and is displaceable in the axial direction of the central axis $\alpha_{20}$. In addition, the hydraulic cylinder 35 displaces the spindle 20 toward the other side in the axial direction (a lower side of FIG. 1) when a working fluid pumped from the pump is supplied via a supply port 36 and simultaneously the working fluid is discharged from a discharge port 37. Meanwhile, the hydraulic cylinder 35 displaces the spindle 20 toward one side in the axial direction (an upper side of FIG. 1) when a working fluid is supplied from the discharge port 37 and simultaneously discharged from the supply port 36. Further, the structure of the pressing device is not limited to the structure of the example. For example, an air cylinder configured to displace the spindle 20 in the axial direction using an air pressure, a ball screw rotated by an electric motor, or the like, may be used as such a pressing device. In any case, various structures that can displace the spindle 20 in the axial direction may be employed as the pressing device.

When an inverter is used to drive and control the electric motor 19, since a current measuring device included in the inverter can be used, there is no particular need to install the current measuring device. In addition, when a servo motor is used as the electric motor 19, since a current measuring device is included in a motor driver in many cases, there is no particular need to install the current measuring device in this case. Meanwhile, when the inverter is not used to drive and control the electric motor 19 or when the servo motor including the current measuring device is not used, various means known in the related art can be employed as the current measuring device configured to measure a current flowing through the electric motor 19.

Next, a method of manufacturing a rolling bearing unit for supporting a wheel of the example performed using the rotating type caulking apparatus 15a having the above-mentioned configuration will be described.

The method of manufacturing a rolling bearing unit for supporting a wheel of the embodiment is characterized in that caulking for forming the caulking section 13 is performed by plastically deforming a portion of the cylindrical section 12 formed on an inner end portion of a hub main body 7 in the axial direction protruding from an inner end opening of an inner ring 8 in the axial direction outward in the radial direction.

Figure 6:
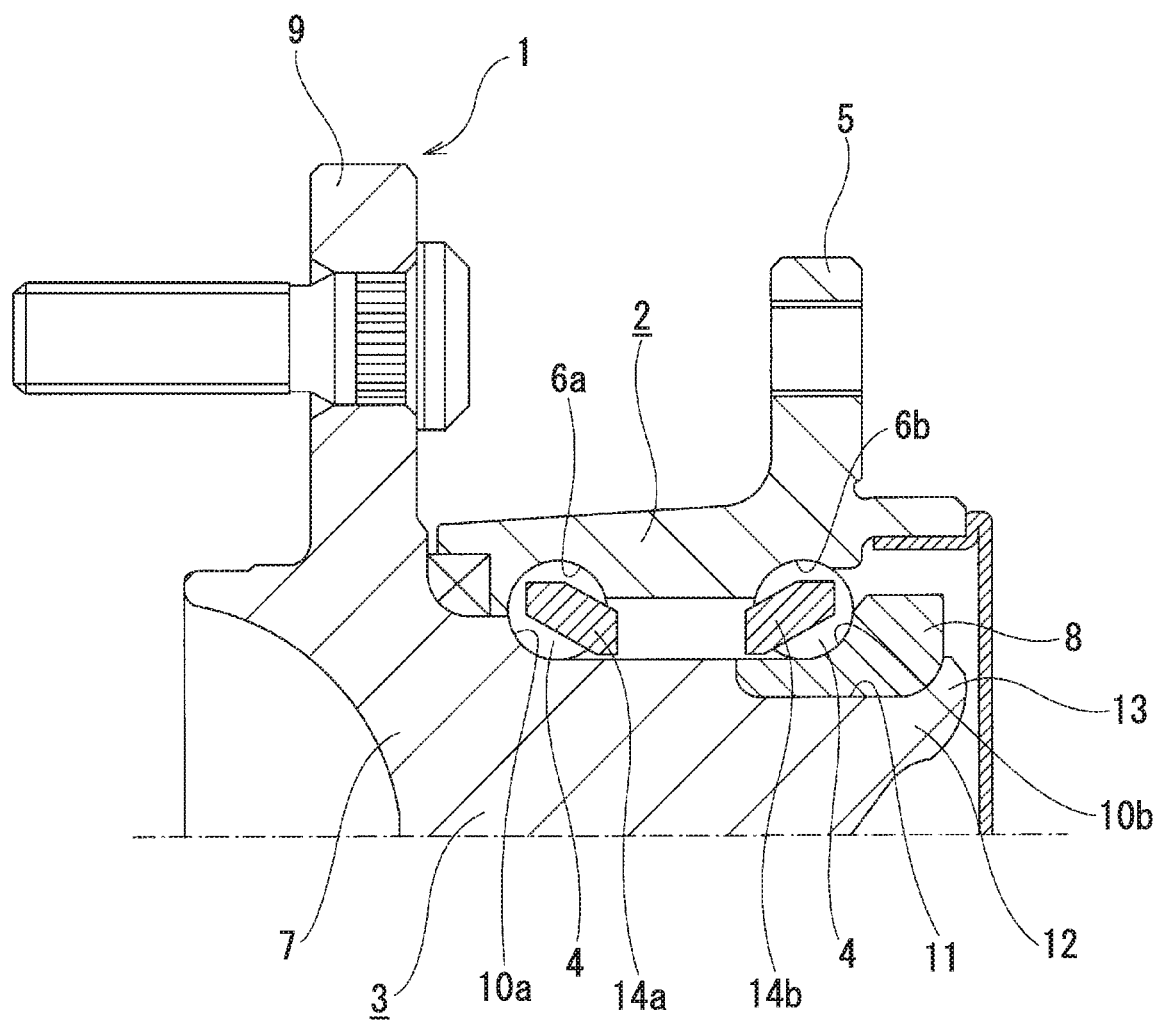
FIG. 6 is a cross-sectional view shown an example of a method of manufacturing a bearing unit for supporting a wheel in the related art.
Figure 7:
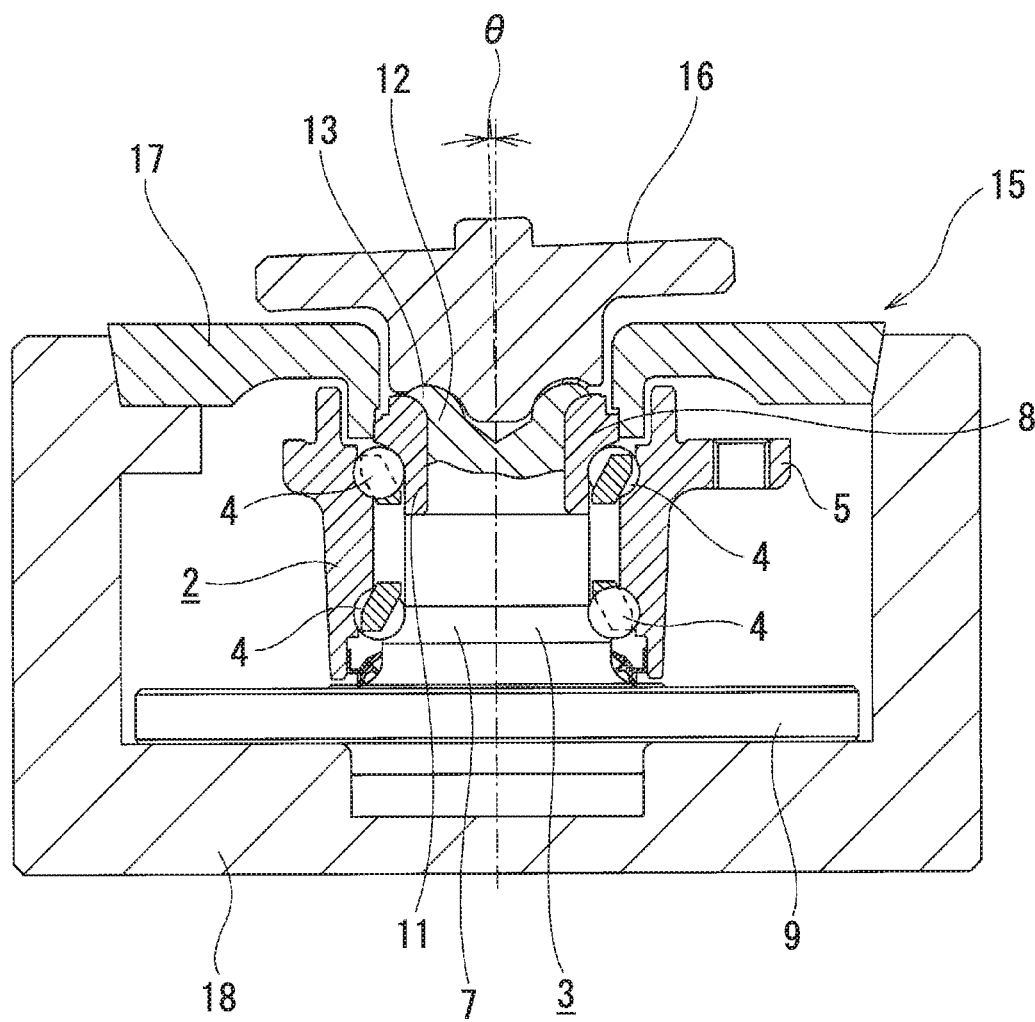
FIG. 7 is a cross-sectional view showing an example of a structure of a rotating type caulking apparatus in the related art.

The method of manufacturing a rolling bearing unit for supporting a wheel of the embodiment is provided in a state in which the outer ring 2 is disposed around the hub main body 7 and the rolling elements 4 and 4 are held between the outer ring track 6a outside in the axial direction among both of the outer ring tracks 6a and 6b and the inner ring track 10a outside in the axial direction by using the retainer 14a (see FIG. 6) disposed at outside in the axial direction. Next, the rolling elements 4 and 4 are installed around the inner ring track 10b, disposed at inside in the axial direction, formed on the outer circumferential surface of the inner ring 8 in a state in which the rolling elements 4 and 4 are held by the retainer 14b disposed inside in the axial direction, and in this state, the inner ring 8 is fastened and fitted onto the small diameter step section 11 formed on the inner end portion of the hub main body 7 in the axial direction. Then, according to the on-fitting work, rolling surfaces of the rolling elements 4 and 4 held by the retainer 14b disposed inside in the axial direction abut the outer ring track 6a at outside in the axial direction to form an intermediate assembly (not shown).

Next, in a state in which the inner end side in the axial direction is directed upward on, the intermediate assembly is fixed to a fixing section 39 of a fixing table 38 that constitutes the rotating type caulking apparatus 15a. In this state, the central axis $\alpha_7$ of the hub main body 7 that constitutes the intermediate assembly is concentric with the central axis $\alpha_{20}$ of the spindle 20.

Next, the electric motor 19 is rotated and driven at a predetermined rotational speed (a constant rotational speed) to rotate and drive the spindle 20, the roll 22 is displaced downward in this state, and a portion of the caulking forming concave groove 31 of the roll 22 is made to abut a portion of the cylindrical section 12 of the hub main body 7 in the circumferential direction. Then, from this state, the caulking forming concave groove 31 of the roll 22 is pressed downward toward the inner end surface of the cylindrical section 12 in the axial direction by the pressing device 23 with a predetermined force. In this state, the roll 22 rotates about the central axis $\alpha_{20}$ of the spindle 20 (precessionally moves around the central axis of the hub main body 7). Then, since the roll 22 is rotatably held by the holding concave section 26 of the roll holding part 21, the roll 22 rotates about the central axis $\alpha_{22}$ thereof on the basis of friction of the abutting section between the caulking forming concave groove 31 of the roll 22 and the cylindrical section 12.

Next, a state of plastic deformation of the cylindrical section 12 when the caulking section 13 is formed in the cylindrical section 12 of the hub main body 7 through such caulking will be described with reference to FIG. 2.

Figure 2:
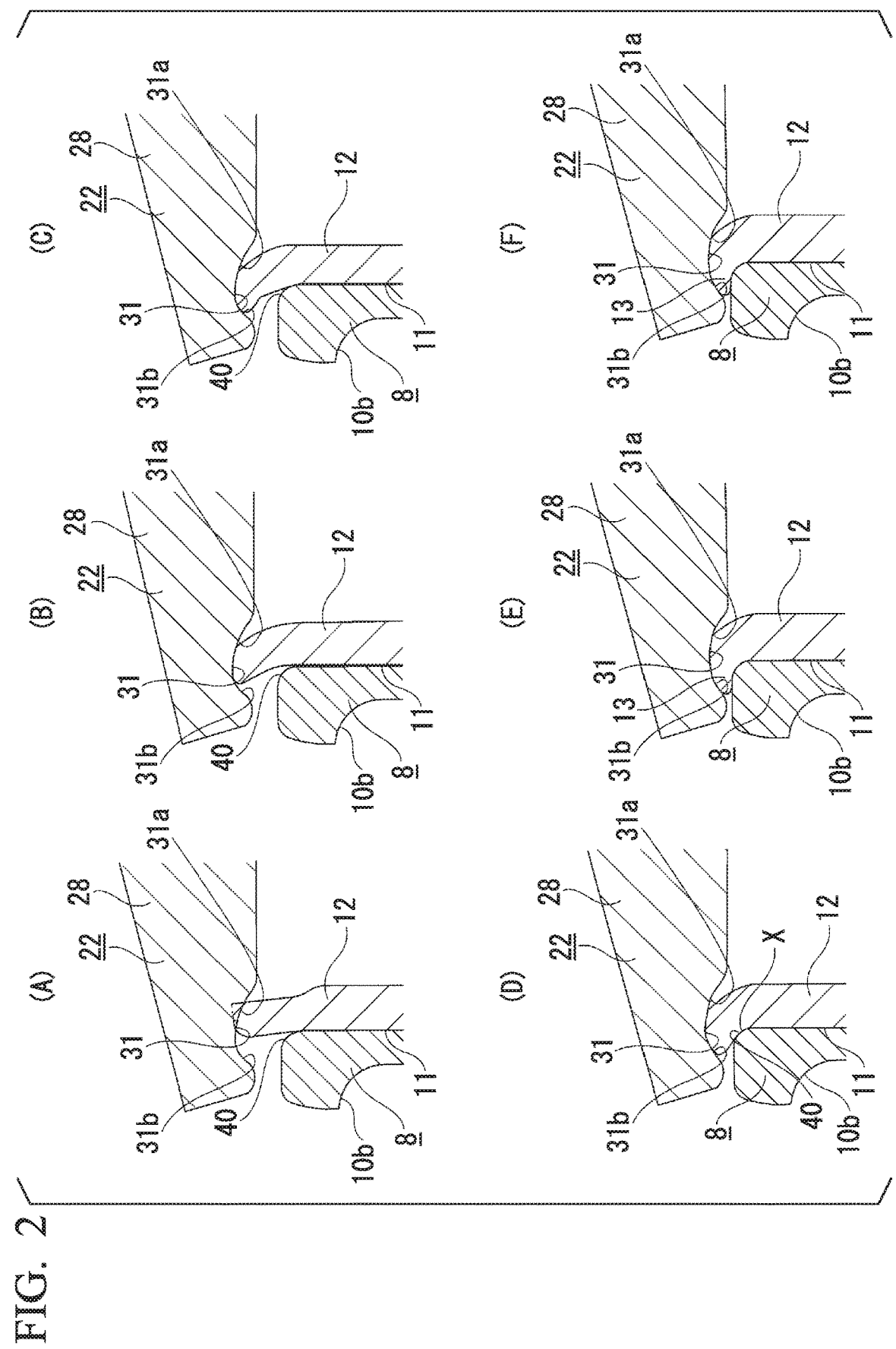
FIG. 2 is a partially enlarged view of an abutting section between a roll of the rotating type caulking apparatus and a cylindrical section of a hub main body according to the first embodiment of the present invention.

First, when the caulking forming section 28 of the roll 22 abuts the cylindrical section 12 to press the cylindrical section 12 downward in the above mentioned way, the inner end surface of the cylindrical section 12 in the axial direction (the upper end surface of the cylindrical section 12 in FIG. 2) is gradually crushed from an inner edge of the inner end surface in the axial direction in the radial direction {a left edge of a portion shown by a two-dotted chain line in FIG. 2(A)}, and as shown by a solid line in FIG. 2(A), forms a shape along a portion 31a of the caulking forming concave groove 31 close to an inner side in the radial direction as shown by the solid line in FIG. 2(A). Further, such deformation continuously advances throughout the circumference of the cylindrical section 12 according to the rotating of the roll 22 around the central axes $\alpha_7$ and $\alpha_{20}$ of the hub main body 7 and the spindle 20. In the state shown in FIG. 2(A), the outer circumferential surface of the inner end portion of the cylindrical section 12 in the axial direction (the portion of the inner ring 8 protruding from the inner end opening in the axial direction) does not abut a curved section 40 having an arc-shaped cross section, which is continuous with the inner end surface of the inner ring 8 in the axial direction and the inner edge of the inner circumferential surface of the inner ring 8 in the axial direction.

When caulking further advances from the state shown in FIG. 2(A), as shown in FIG. 2(B), the inner end surface of the cylindrical section 12 in the axial direction moves a bottom surface of the caulking forming concave groove 31 along the outer side from the inner side of the roll 22 in the radial direction, and the cylindrical section 12 starts to bend in a direction in which an inner diameter dimension increases toward the inside in the axial direction. Then, as shown in FIG. 2(C), the cylindrical section 12 is bent outward in the radial direction until the inner end surface of the cylindrical section 12 in the axial direction is disposed at a portion 31b of the caulking forming concave groove 31 close to an outer side in the radial direction. Further, in the state shown in FIGS. 2(B) and 2(C), the outer circumferential surface of the inner end portion of the cylindrical section 12 in the axial direction still does not abut the curved section 40.

In the state shown in FIG. 2(C), the cylindrical section 12 is restrained to the portion 31b of the caulking forming concave groove 31 close to the outer side in the radial direction and cannot be easily bent further outward in the radial direction. When caulking further advances from the state shown in FIG. 2(C), the cylindrical section 12 is deformed to be crushed outward in the axial direction into a state shown in FIG. 2(D). Further, in the state shown in FIG. 2(D), the outer circumferential surface of the inner end portion of the cylindrical section 12 in the axial direction abuts the curved section 40 at a position X of FIG. 2(D).

In the state shown in FIG. 2(D), as stress concentration occurs in the abutting section between the outer circumferential surface of the cylindrical section 12 and the curved section 40, the inner end portion of the cylindrical section 12 in the axial direction is easily deformed outward in the axial direction. When caulking further advances from the state shown in FIG. 2(D), the abutting section (the position X) between the outer circumferential surface of the cylindrical section 12 and the curved section 40 becomes a starting point, and the inner end portion of the cylindrical section 12 in the axial direction is deformed to be crushed outward in the axial direction into a state shown in FIG. 2(E). That is, an abutting area between a portion corresponding to the outer circumferential surface of the intermediate section of the cylindrical section 12 before deformation in the axial direction and the inner end surface of the inner ring 8 in the axial direction gradually increases according to deformation of the inner end portion of the cylindrical section 12 in the axial direction.

FIG. 2(F) shows a state after a certain time (for example, about 10 seconds) elapses from the state shown in FIG. 2(E). Comparing the state shown in FIG. 2(E) and the state shown in FIG. 2(F), a shape of the caulking section is hardly changed. Accordingly, from the viewpoint of the shape, formation of the caulking section is terminated in the state shown in FIG. 2(E). However, from the viewpoint of the shape only, in the vicinity of a boundary between (VI) and (VII) of FIG. 3, which will be described below, it is impossible to accurately ascertain the termination of formation of the caulking section. For this reason, in order to accurately ascertain the termination of the formation of the caulking section, it is necessary to judge from the viewpoint of a current value (a rotational torque).

In the case of the manufacturing method of the embodiment, during the caulking such as mentioned above, a magnitude of the current flowing through the electric motor 19 is measured by the current measuring device. Further, the current generally flowing through the electric motor and the rotational torque generated by the electric motor have a correlation (a proportional relation), and the rotational torque generated by the electric motor can be obtained on the basis of the measured current value flowing through the electric motor. Here, while loss of the motor such as iron loss, and an influence of slippage are considered, it is usually negligible. That is, in the case of the embodiment, the current flowing through the electric motor 19 measured by the current measuring device corresponds to a physical amount. Further, in addition to the current flowing through the electric motor 19, a rotational speed of the electric motor 19 or a portion rotated synchronously with the electric motor 19 {a rotational speed decreases (increases) when a torque required for caulking at a constant voltage and current increases (decreases)}, an electric power measured by attaching an ammeter (an electric power increases when a torque increases), and so on, can be employed as physical amounts. In addition, for example, a method of installing a torque sensor on the spindle 20 to directly measure a torque may be employed.

In the case of the embodiment, since the electric motor 19 is rotated and driven at a constant rotational speed, a magnitude of the current flowing through the electric motor 19 is changed according to a magnitude of the rotational torque generated in the abutting section between the cylindrical section 12 and the roll 22.

Then, in the case of the embodiment, a condition (timing) of terminating the caulking is determined on the basis of a current value (a rotational torque) measured by the current measuring device.

Hereinafter, a method of determining a timing of terminating caulking will be described on the basis of a current value (a rotational torque) measured by the current measuring device.

Figure 3:
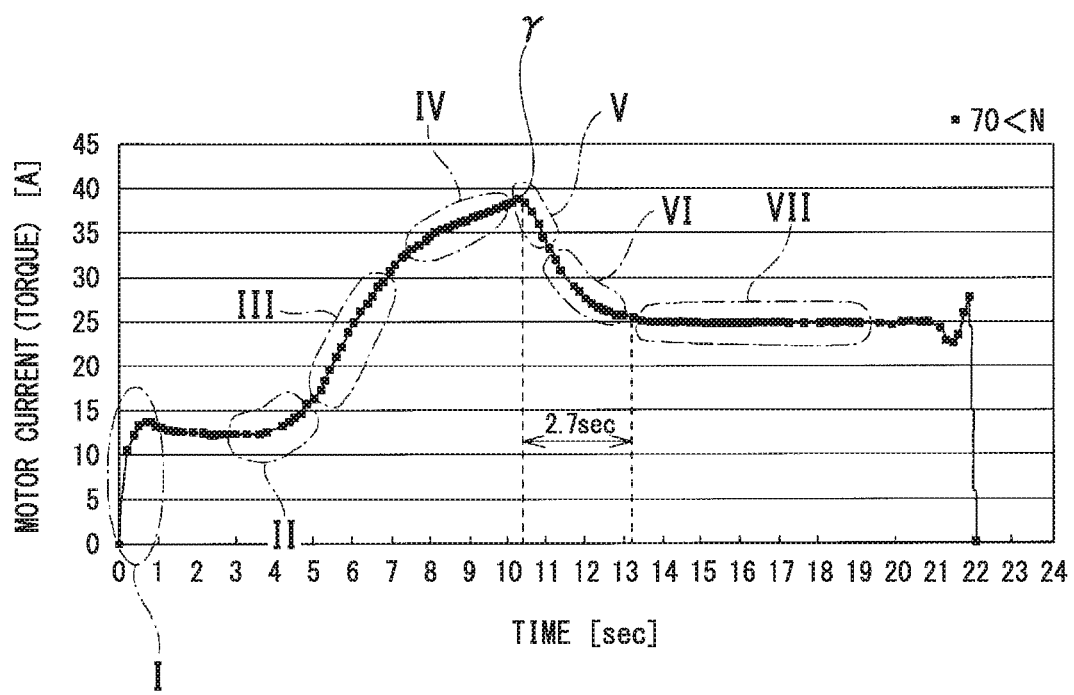
FIG. 3 is a diagram showing a relation between a caulking time and a motor current.

First, during the above-mentioned caulking, a relation between the current value flowing through the electric motor 19 and the processing time measured from the driving of the electric motor 19 to the state of FIG. 2(F) is as shown in the diagram of FIG. 3. Accordingly, a rotational torque having a relation with the current value and generated by the electric motor 19 also draws substantially the same trajectory as the diagram shown in FIG. 3.

In the diagram shown in FIG. 3, a portion shown by (I) is immediately after conduction to the electric motor 19 is started, and a current value (a rotational torque) abruptly increases.

Figure 5:
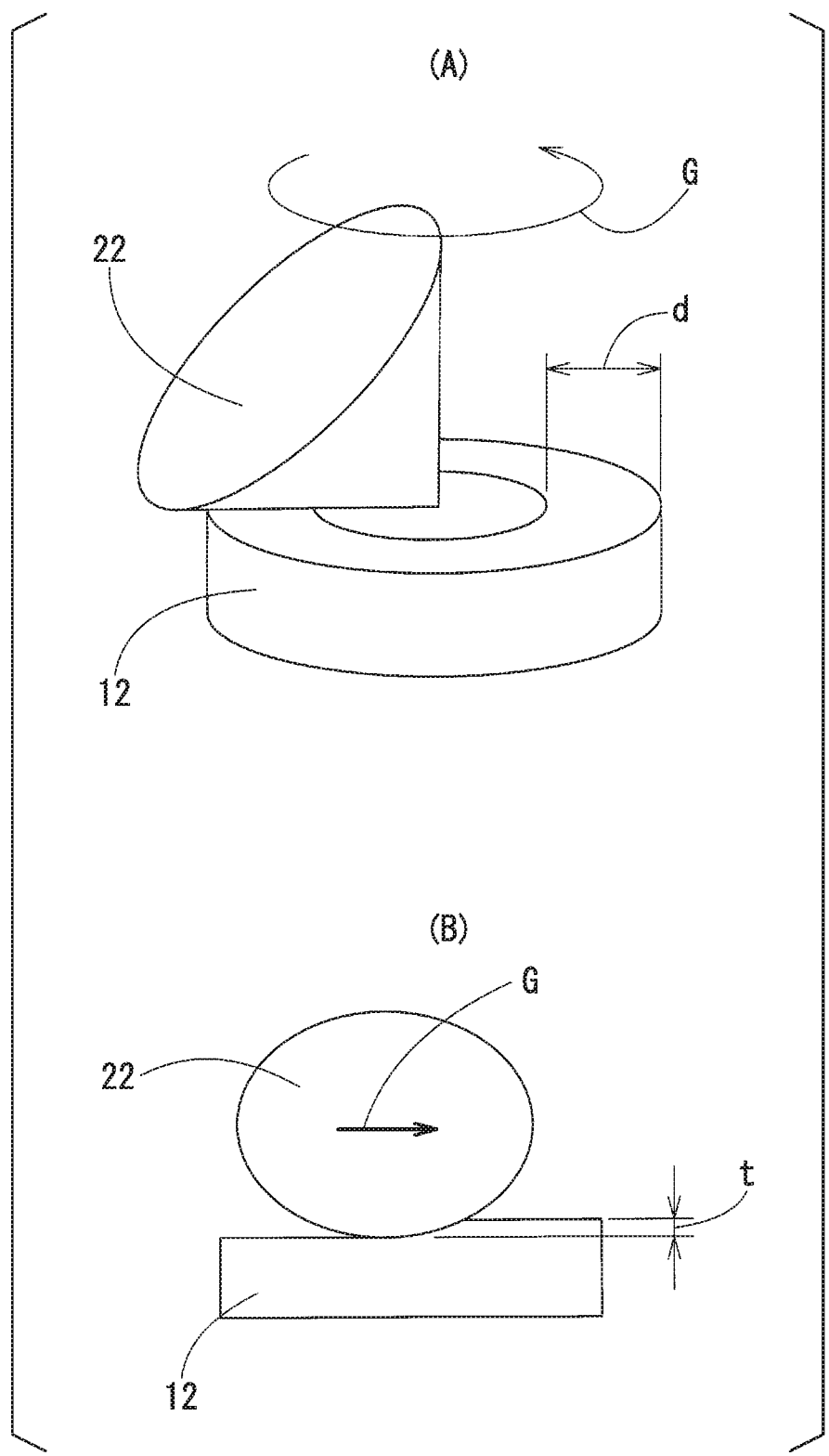
FIG. 5 is a schematic view showing an aspect in which a roll presses a cylindrical section of a hub main body during caulking.

In addition, in a portion shown by (II) in FIG. 3, a current value (a rotational torque) gently increases. The portion shown by (II) shows an aspect of a change of a current value (a rotational torque) during deformation from a state in which the caulking forming concave groove 31 of the roll 22 abuts an inner edge in the radial direction of the inner end surface in the axial direction of the cylindrical section 12 to a state in which the cylindrical section 12 is gradually crushed as shown in FIG. 2(A). Further, a load torque $T_a$ generated in the abutting section between the cylindrical section 12 and the roll 22 is largely influenced by a cross-sectional area S of a pressure drop region in the axial direction in which the roll 22 presses the cylindrical section 12, a deformation resistance Y of the cylindrical section 12 and a distance R from the central axes $\alpha_7$ and $\alpha_{20}$ of the hub main body 7 (the spindle 20) to a center of the abutting section and can be approximately obtained by the following equation (1). FIG. 5 is a schematic view showing an aspect in which the roll presses the cylindrical section of the hub main body during caulking. FIG. 5(A) is a perspective view schematically showing an aspect in which the roll presses the cylindrical section of the hub main body during caulking, and FIG. 5(B) is a view showing FIG. 5(A) from a left side. Here, as shown in FIG. 5, the cross-sectional area S of the pressure drop region in the axial direction may be obtained by approximating a product of a radial dimension d of the portion in which the roll 22 presses the cylindrical section 12 and an amount in which the roll 22 crushes the cylindrical section 12 in the axial direction (a crushing margin) t (S=d·t) when the roll 22 rotates about the central axis $\alpha_{20}$ of the spindle 20 in a direction shown by an arrow G in FIG. 5. Accordingly, provided that a starting torque immediately after conduction to the electric motor 19 is started is $T_S$, when the load torque $T_a$ is applied to the roll 22, the rotational torque T generated by the electric motor 19 can be approximately obtained by the following equation (2).

[Math. 1]

$$T_a = S \cdot Y \cdot R \tag{1}$$

[Math. 2]

$$T = T_S + T_a \tag{2}$$

In the portion shown by (II) in FIG. 3, the cylindrical section 12 is gradually crushed from a state in which the caulking forming concave groove 31 of the roll 22 abuts the inner edge in the radial direction of the inner end surface in the axial direction of the cylindrical section 12. Accordingly, in the above-mentioned equation (1), as an abutting area S of the abutting section increases little by little, the current value (the rotational torque) gently increases.

In addition, in a portion shown by (III) in FIG. 3, the current value (the rotational torque) increases with a relatively rapid gradient. The portion shown by (III) in FIG. 3 shows an aspect of a change of the current value (the rotational torque) during a change from the state shown in FIG. 2(A) to the state shown in FIG. 2(C) via the state shown in FIG. 2(B). As described above, when the current value is changed from the state of FIG. 2(A) to the state of FIG. 2(C), the cylindrical section 12 is deformed to be bent in a direction in which the inner diameter dimension increases inward in the axial direction while the inner end surface of the cylindrical section 12 in the axial direction moves the bottom surface of the caulking forming concave groove 31 along the outside from the inside of the roll 22 in the radial direction. When the cylindrical section 12 is deformed in this way, the distance R in the equation (1) increases, and the current value (the rotational torque) increases in proportion to the increase in the distance R.

In addition, in a portion shown by (IV) in FIG. 3, the current value (the rotational torque) increases relatively more gently than the portion shown by (III) in FIG. 3. The portion shown by (IV) in FIG. 3 shows an aspect of a change of a current value (a rotational torque) when the current value is changed from the state shown in FIG. 2(C) to the state shown in FIG. 2(D). As described above, in the state shown in FIG. 2(C), the cylindrical section 12 restricted to the portion 31b of the caulking forming concave groove 31 close to the outer side in the radial direction cannot be easily deformed outward in the radial direction of the cylindrical section 12. For this reason, when caulking further advances from the state shown in FIG. 2(C), the cylindrical section 12 is deformed to be crushed outward in the axial direction into the state shown in FIG. 2(D). Accordingly, the abutting area S of the abutting section in the equation (1) increases to an extent that the cylindrical section 12 is crushed outward in the axial direction. However, since an increasing rate of the abutting area S is smaller than an increasing rate of the distance R of the portion shown by (III) in FIG. 3, the current value (the rotational torque) increases more gently in the portion shown by (IV) in FIG. 3 than in the portion shown by (III) in FIG. 3.

In addition, in a portion shown by (V) in FIG. 3, the current value (the torque) abruptly decreases at a predetermined change ratio or more. The portion shown by (V) in FIG. 3 shows an aspect of a change of a current value (a rotational torque) of a front half section while the current value is changed from the state shown in FIG. 2(D) to the state shown in FIG. 2(E). As described above, in the state shown in FIG. 2(D), as stress concentration occurs in the abutting section between the outer circumferential surface of the cylindrical section 12 and the curved section 40, the inner end portion of the cylindrical section 12 in the axial direction can be easily deformed outward in the axial direction. In this way, in the portion shown by (V) in FIG. 3, since the deformation resistance Y in the equation (1) abruptly decreases, the current value (the rotational torque) decreases abruptly (at a change ratio of a predetermined value or more).

In addition, in a portion shown by (VI) in FIG. 3, as the time elapses, reduction of the current value (the rotational torque) gradually becomes gentle. The portion shown by (VI) in FIG. 3 shows an aspect of a change of a current value (a rotational torque) of a rear half section during a change from the state shown in FIG. 2(D) to the state shown in FIG. 2(E). That is, in the portion (V) in FIG. 3, while the current value (the rotational torque) also abruptly decreases according to abrupt reduction of the deformation resistance Y as described above, after that, as an abutting area between the portion corresponding to the outer circumferential surface of intermediate section of the cylindrical section 12 in the axial direction before deformation and the inner end surface of the inner ring 8 in the axial direction gradually increases, the deformation resistance Y gradually increases. Then, the inner end portion of the cylindrical section 12 in the axial direction cannot easily be further deformed by a pressing force applied by the pressing device 23. For this reason, in the portion shown by (VI) in FIG. 3, as the time elapses, reduction of the current value (the rotational torque) gradually becomes gentle.

In addition, in a portion shown by (VII) in FIG. 3, a change ratio of the current value (the rotational torque) converges within a predetermined range. The portion shown by (VII) in FIG. 3 shows an aspect of a change of a current value (a rotational torque) when the current value is changed from the state shown in FIG. 2(E) to the state shown in FIG. 2(F). As described above, in the state shown in FIG. 2(E) and the state shown in FIG. 2(F), the shape of the caulking section 13 is hardly changed. Accordingly, from the viewpoint of the current value (the rotational torque), in the state of FIG. 2(E), the caulking section 13 is terminated.

In the case of the manufacturing method of the embodiment, a timing of terminating the caulking is determined on the basis of the current value measured by the current measuring device as described above or the rotational torque obtained based on the current value. Specifically, in the case of the embodiment, like the portion shown by (V) in FIG. 3, after a predetermined time $T_p$ has elapsed from the time when the current value (the rotational torque) decreases abruptly (at a change ratio of a predetermined value $A_r$ or more) (a time shown by γ in FIG. 3), the caulking is terminated. In the case of the embodiment, the predetermined time is 3.5 seconds. As shown in FIG. 3, this is because a change of the current (the rotational torque) starts to converge within a predetermined range after about 2.7 seconds elapses from the time shown by γ in FIG. 3. Further, a time point when the current value (the rotational torque) abruptly decreases or a time until a change of the current (the rotational torque) starts to converge within a predetermined range from the time point differs due to a size (a mold number) of a rolling bearing unit for supporting a wheel, a size of an electric motor, or the like. For this reason, the predetermined time $T_p$ can be appropriately determined on the basis of a result such as a previously performed simulation, experiment, or the like. Similarly, a change ratio $A_r$ of the current value when the deformation resistance Y abruptly decreases differs due to various conditions, and can be previously obtained through the simulation or experiment.

According to the method of manufacturing a rolling bearing unit for supporting a wheel of the embodiment configured as above, optimization of the processing time of the caulking of each workpiece is achieved.

That is, in the case of the embodiment, during caulking for forming the caulking section 13, a current value flowing through the electric motor 19 is detected, and a time consumed to terminate the caulking is determined on the basis of a state of the current value obtained by the detection or the rotational torque obtained from the current value. Specifically, as described above, like the portion shown by (V) in FIG. 3, after a predetermined time $T_p$ (in the case of the embodiment, 3.5 seconds) elapses from a time point (a time point shown by γ in FIG. 3) at which the current value (the rotational torque) decreases abruptly (at a change ratio of a predetermined value $A_r$ or more), the caulking is terminated. The rotational torque or the physical amount detected in this way has a correlation between an axial force applied to the inner ring by the caulking section and a magnitude of a preload applied to the rolling element. For this reason, when a condition in which the caulking is terminated on the basis of a state of the rotational torque or the physical amount is obtained by the detection of each workpiece (according to a manufacturing error, a difference in property, or the like) is determined, optimization of the processing time of the caulking of each workpiece can be achieved (the processing time can be prevented from being excessively shortened or wastefully lengthened). That is, when the time consumed to terminate the caulking is determined on the basis of the state of the current value (the rotational torque) obtained by the detection of each workpiece, optimization of the processing time of the caulking of each workpiece can be achieved (the processing time can be prevented from being excessively shortened or wastefully lengthened).

Second Embodiment

A second embodiment of the present invention will be described with reference to FIGS. 2 and 3. Even in the case of the method of manufacturing a rolling bearing unit for supporting a wheel of the embodiment, a current value flowing through the electric motor 19 during the caulking is measured.

In particular, in the case of the embodiment, after the caulking is started and the current value or the rotational torque obtained from the current value increases as shown by (II) to (IV) in FIG. 3 and abruptly decreases as shown by (V) in FIG. 3, like the portion shown by (VII) in FIG. 3, the caulking is terminated at a time point at which it is confirmed that a change of the current value (the rotational torque) converges within a predetermined range. Specifically, in the case of the embodiment, in a state in which a change amount ε of the current value (the rotational torque) converges within a predetermined range ($-0.5 \leq \varepsilon \leq 0.5$) for a predetermined time (in the case of the embodiment, 0.5 to 1 seconds), it is determined that the current value (the rotational torque) is constant, and the caulking is terminated. Configurations and effects of the other components are the same as in the above-mentioned first embodiment.

INDUSTRIAL APPLICABILITY

In the above-mentioned embodiments, the rotational torque generated by the electric motor during the caulking is obtained from the current value flowing through the electric motor. However, for example, a rotational torque may be directly measured by a so-called magneto-striction type torque sensor or the like installed on an output shaft of the electric motor or a spindle coupled and fixed to the output shaft.

Figure 4:
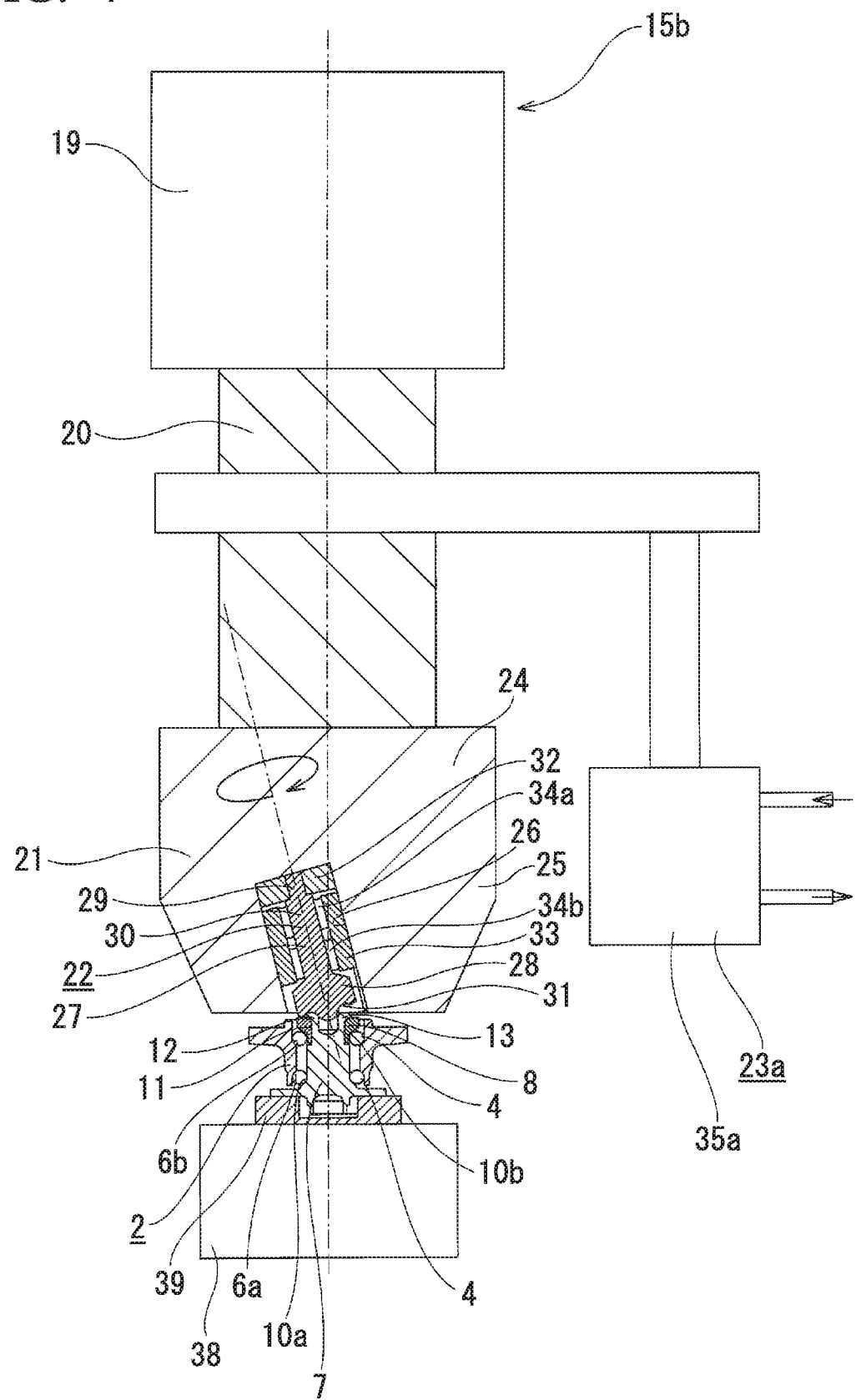
FIG. 4 is a schematic cross-sectional view of a rotating type caulking apparatus of a second embodiment of the present invention.

In addition, the pressing device that constitutes the rotating type caulking apparatus is not limited to the structure of each of the above-mentioned embodiments. For example, like the pressing device 23a that constitutes the rotating type caulking apparatus 15b shown in FIG. 4, a structure in which the hydraulic cylinder 35a configured to displace the spindle 20 in the axial direction is installed at a position separated from the spindle 20 may be employed.

REFERENCE SIGNS LIST

1 Rolling bearing unit for supporting wheel
2 Outer ring
3 Hub
4 Rolling element
5 Stationary side flange
6a, 6b Outer ring track
7 Hub main body
8 Inner ring
9 Rotary side flange
10a, 10b Inner ring track
11 Small diameter step section
12 Cylindrical section
13 Caulking section
14a, 14b Retainer
15, 15a, 15b Rotating type caulking apparatus
16 Mold
17 Pressing tool
18 Holder
19 Electric motor
20 Spindle
21 Roll holding part
22 Roll
23, 23a Pressing device
24 Columnar section
25 Partial conical section
26 Holding concave section
27 Support section
28 Caulking forming section
29 Small diameter shaft section
30 Large diameter shaft section
31 Caulking forming concave groove
31a Portion close to inner side in radial direction
31b Portion close to outer side in radial direction
32 Ring-shaped holding member
33 Sleeve
34a, 34b Rolling bearing
35, 35a Hydraulic cylinder
36 Supply port
37 Discharge port
38 Fixing table
39 Fixing section
40 Curved section

The invention claimed is:

1. A method of manufacturing a rolling bearing unit for supporting a wheel,
the rolling bearing unit comprising:
a hub main body having an outer-side inner ring track that is formed on an outer circumferential surface of an intermediate section of the hub main body in an axial direction; and
an inner ring that has an inner-side inner ring track formed on an outer circumferential surface of the inner ring and that is fitted onto a portion of the hub main body close to an inner end of the hub main body in the axial direction,
wherein the inner ring is fixed to the hub main body by pressing an inner end surface of the inner ring in the axial direction with a caulking section, the caulking section being formed by plastically deforming a cylindrical section, installed on an inner end portion of the hub main body in the axial direction, outward in a radial direction, and the caulking section is formed by pressing a roll against the cylindrical section while the roll is rotated about a central axis of the hub main body by an electric motor, the roll being supported in a rotatable state about a central axis of the roll which is inclined with respect to a central axis of the hub main body, the method of manufacturing a rolling bearing unit for supporting a wheel comprising:

detecting a rotational torque generated by the electric motor or a current value of the electric motor having a correlation with the rotational torque during a caulking process for forming the caulking section, determining a condition for terminating the caulking process on the basis of the detection result, and terminating the caulking process after a predetermined time elapses from a time point at which a magnitude of the rotational torque or the current value of the electric motor has decreased at a change ratio of a predetermined value or more.

2. A method of manufacturing a vehicle using the method of manufacturing a rolling bearing unit for supporting a wheel according to claim 1.

3. A method of manufacturing a rolling bearing unit for supporting a wheel, the rolling bearing unit comprising:

a hub main body having an outer-side inner ring track that is formed on an outer circumferential surface of an intermediate section of the hub main body in an axial direction; and an inner ring that has an inner-side inner ring track formed on an outer circumferential surface of the inner ring and that is fitted onto a portion of the hub main body close to an inner end of the hub main body in the axial direction, wherein the inner ring is fixed to the hub main body by pressing an inner end surface of the inner ring in the axial direction with a caulking section, the caulking section being formed by plastically deforming a cylindrical section, installed on an inner end portion of the hub main body in the axial direction, outward in a radial direction, and the caulking section is formed by pressing a roll against the cylindrical section while the roll is rotated about a central axis of the hub main body by an electric motor, the roll being supported in a rotatable state about a central axis of the roll which is inclined with respect to a central axis of the hub main body, the method of manufacturing a rolling bearing unit for supporting a wheel comprising:

detecting a rotational torque generated by the electric motor or a current value of the electric motor having a correlation with the rotational torque during a caulking process for forming the caulking section, determining a condition for terminating the caulking process on the basis of the detection result, and terminating the caulking process under a condition in which a change ratio of the rotational torque or the current value of the electric motor converges within a predetermined range for a predetermined time after a magnitude of the rotational torque or the physical amount has decreased at a change ratio of a predetermined value or more.

4. A method of manufacturing a vehicle using the method of manufacturing a rolling bearing unit for supporting a wheel according to claim 3.

* * * * *